United States Patent
Bowe

(10) Patent No.: US 9,452,647 B2
(45) Date of Patent: Sep. 27, 2016

(54) REMOVABLE CHAIN ATTACHMENT INSERT

(71) Applicant: CURT Manufacturing, LLC, Eau Claire, WI (US)

(72) Inventor: Curtis M. Bowe, Chippewa Falls, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 144 days.

(21) Appl. No.: 14/340,766

(22) Filed: Jul. 25, 2014

(65) Prior Publication Data
US 2015/0028565 A1 Jan. 29, 2015

Related U.S. Application Data

(60) Provisional application No. 61/858,435, filed on Jul. 25, 2013.

(51) Int. Cl.
*B60D 1/02* (2006.01)
*B60D 1/52* (2006.01)

(52) U.S. Cl.
CPC .................. *B60D 1/025* (2013.01); *B60D 1/52* (2013.01); *Y10T 29/49826* (2015.01)

(58) Field of Classification Search
CPC .......... B60D 1/488; B60D 1/28; B60D 1/58; B60D 1/02; B60D 1/025; B60D 1/04; B60D 1/187; B60D 1/18; B60D 1/583; B60P 7/06; B60P 7/08; F16B 21/02; F16B 21/04
USPC .................... 280/432, 457, 507, 491.5, 901; 410/101, 110, 102, 106; 411/385, 987, 411/997, 354
See application file for complete search history.

(56) References Cited

U.S. PATENT DOCUMENTS

| | | | | |
|---|---|---|---|---|
| 1,829,293 A * | 10/1931 | Olson | ..................... | F16B 39/06 411/140 |
| 3,252,681 A * | 5/1966 | Watts | ...................... | F16G 11/10 294/93 |
| 4,840,528 A * | 6/1989 | Doom | ..................... | F16B 21/12 411/340 |
| 5,394,948 A * | 3/1995 | Bunnell | .................. | B60D 1/02 172/677 |
| 6,065,766 A | 5/2000 | Pulliam | | |
| 6,846,140 B2 * | 1/2005 | Anderson | ............. | B60P 7/0815 410/102 |
| 7,401,995 B2 * | 7/2008 | Senakiewich, II | .... | B60P 7/0815 403/252 |
| 7,988,176 B2 | 8/2011 | Colibert et al. | | |
| 7,988,177 B2 | 8/2011 | Colibert et al. | | |
| 8,215,658 B2 | 7/2012 | Stanifer et al. | | |
| D668,187 S | 10/2012 | McCoy | | |
| 8,360,458 B2 | 1/2013 | Stanifer et al. | | |
| 8,414,009 B2 | 4/2013 | Stanifer et al. | | |
| D683,277 S | 5/2013 | McCoy | | |
| 8,845,249 B2 * | 9/2014 | Rowles | ................. | B60P 7/0815 410/105 |
| 8,974,161 B1 * | 3/2015 | Hemphill | .............. | B60P 7/0807 410/106 |
| 2012/0031940 A1 | 2/2012 | Leech et al. | | |
| 2013/0113181 A1 | 5/2013 | Stanifer et al. | | |

* cited by examiner

*Primary Examiner* — Anne Marie Boehler
(74) *Attorney, Agent, or Firm* — Shewchuk IP Services, LLC; Jeffrey D. Shewchuk

(57) ABSTRACT

A chain attachment insert has a body with a flat underside, and provides an open loop chain attachment for receiving a chain or hook in a socket in the bed of a truck. A T-bolt portion of the chain attachment insert is received in the socket. A hole through the body extends parallel to the axis of rotation defined by the T-bolt portion, and an interference peg is vertically slidable into the hole after rotation of the chain attachment insert relative to the socket. The interference peg then rests with a portion of the interference peg in the socket to interfere with and prevent the chain attachment insert from rotating relative to the socket. A lock secures the interference peg within the hole in the body.

20 Claims, 8 Drawing Sheets

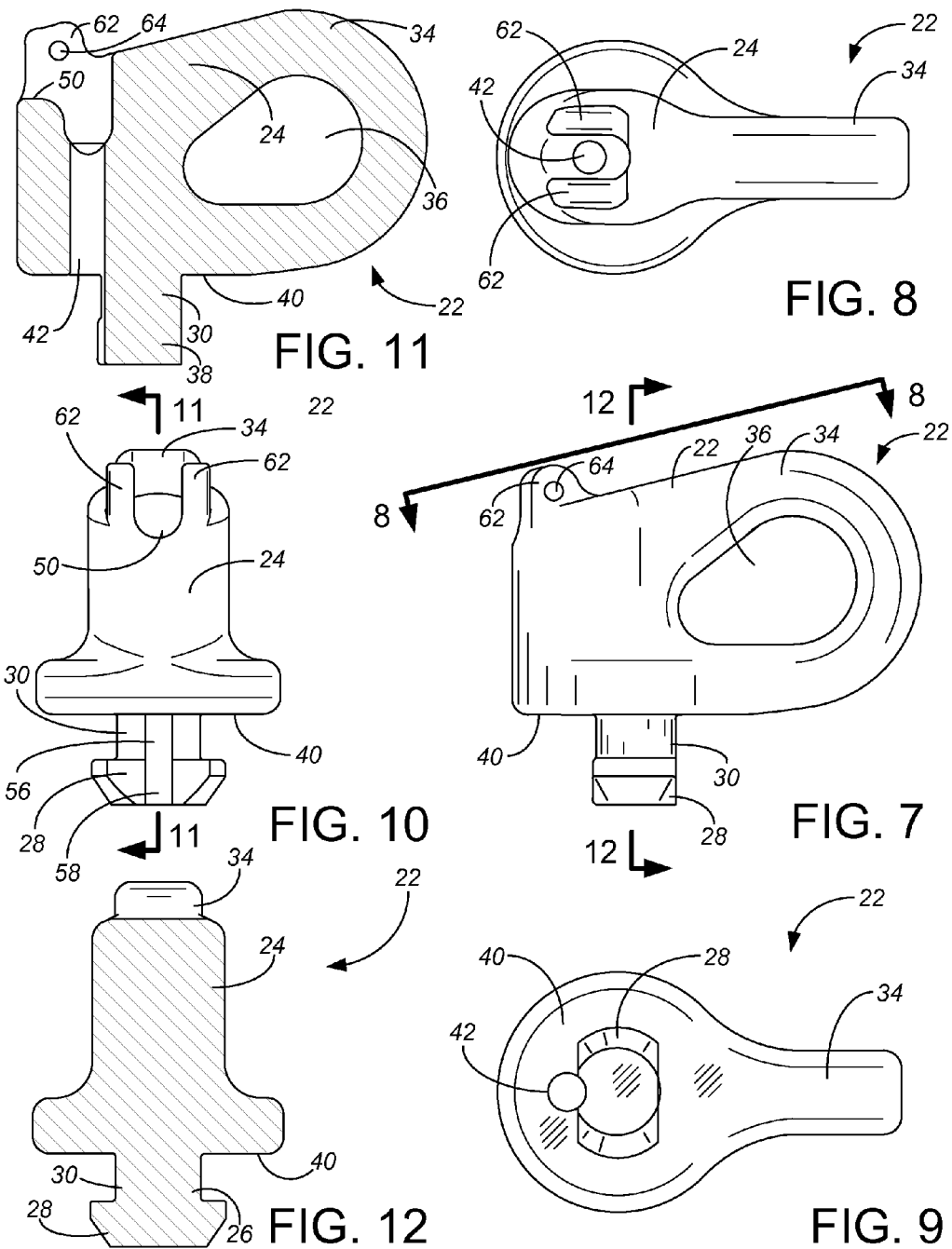

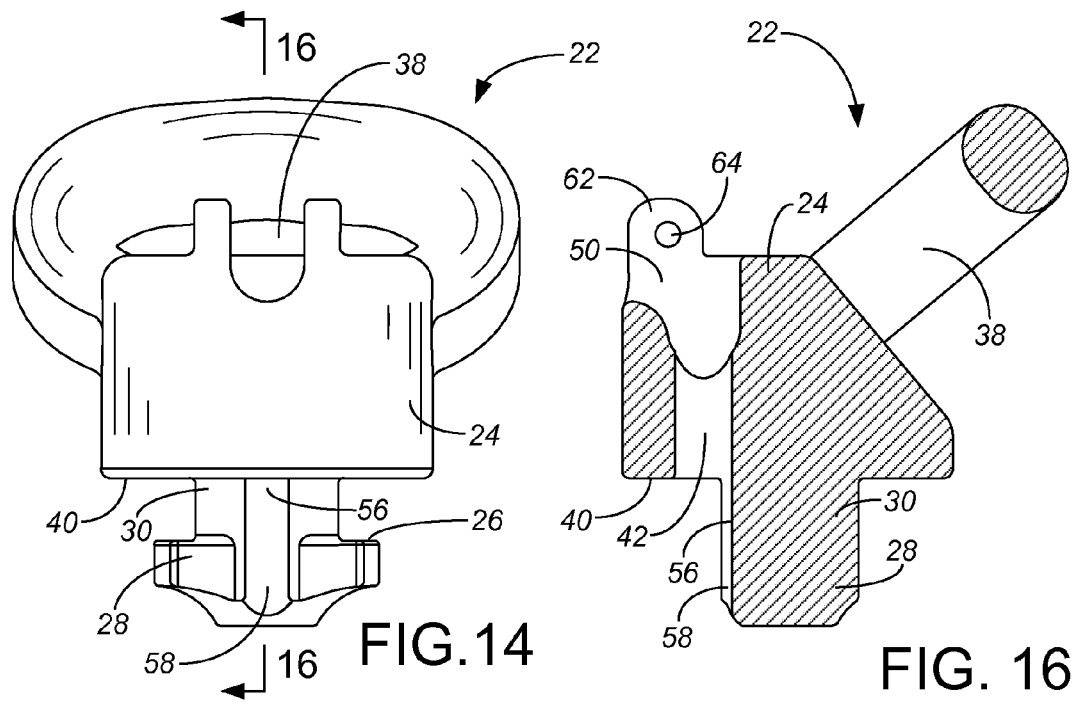
FIG. 14
FIG. 16
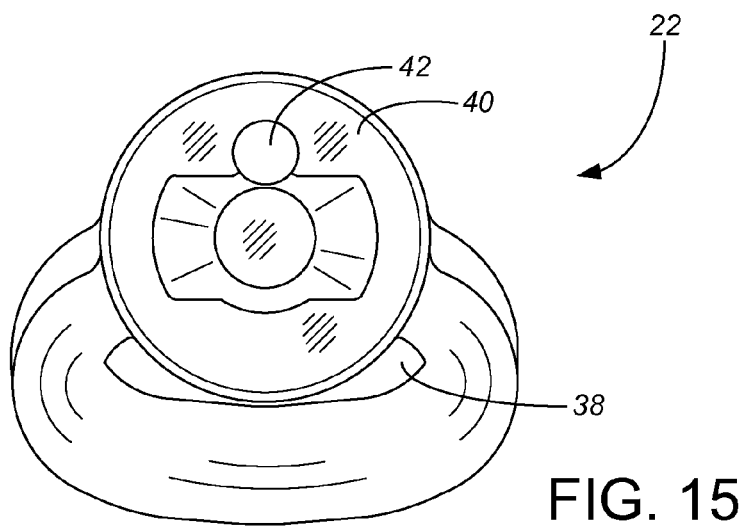
FIG. 15

US 9,452,647 B2

REMOVABLE CHAIN ATTACHMENT INSERT

CROSS-REFERENCE TO RELATED APPLICATION(S)

The present application claims priority from U.S. Provisional Application No. 61/858,435 entitled REMOVABLE SAFETY CHAIN ATTACHMENT INSERT filed Jul. 25, 2013, incorporated herein by reference.

BACKGROUND OF THE INVENTION

The present invention relates to hitch configurations used in truck beds, particularly beneficial for hitch configurations that also use safety chains. Several existing hitches and original equipment pickups include spaced sockets exposed in the pickup truck bed, such as those disclosed in U.S. Pat. Pub. Nos. 2012/0031940 and 2013/0113181 and U.S. Pat. Nos. 6,065,766, 7,988,176, 7,988,177, 8,215,658, 8,360,458, 8,414,009, each incorporated by reference. The most common socket design involves a generally rectangular or oblong slot which can receive the head of a T-bolt. The sockets are located in the pickup truck bed, generally flush with the face of the truck bed. The sockets are used when the hitch or other device is installed, but the truck bed with its sockets is generally flat so as to be used without interference when the hitch or other device is absent. To use the socket, the T-bolt is inserted vertically (head down) into the socket and then rotated 90° so the long part of the T-bolt head is under the narrower flats 16 of the socket. In one existing socket design, the slot is about one inch wide and about 1.63 inches long, with curved ends so the entire slot fits within a 1.63 inch diameter circle.

Pickup truck owners can utilize the sockets to attach other structures to the pickup truck bed, such as safety chains or tie down structures. Whenever the sockets are used for safety chains or other tie down structures, care must be taken that the T-bolt mating with the socket does not inadvertently rotate about its vertical axis to a position where the head is aligned with the socket opening and the T-bolt can pull free of the socket. U.S. Pat. Nos. 8,215,658, 8,360,452 and Patent Pub. No. 2013/0113181 teach removable safety chain tie down constructions that incorporate structure to prevent the T-bolt from inadvertently rotating about its vertical axis. However, each of these designs are relatively complex, and therefore involve a higher cost of manufacture and are more prone to failure than optimal. Better designs to utilize the sockets are needed.

BRIEF SUMMARY OF THE INVENTION

The present invention is a structure and method of use of a chain attachment insert for use with a socket in the bed of a pickup truck. The chain attachment insert has a body with a flat underside which provides an open loop chain attachment for receiving a chain or hook above the bed of the truck, and a T-bolt head and neck received in the socket. A hole through the body extends parallel to the axis of rotation defined by the T-bolt portion, and an interference peg is vertically slidable into the hole. The interference peg then rests with a portion of the interference peg in the socket to interfere with and prevent the chain attachment insert from rotating relative to the socket, such that the T-bolt head holds the chain attachment insert to the socket. A lock secures the interference peg within the hole in the body. The user can separately and independently decide when to attach the insert to the socket and when to attach the chain or hook to the open loop chain attachment.

BRIEF DESCRIPTION OF THE DRAWINGS

The present invention is described with reference to the attached drawings, which show two different embodiments:

FIG. 7 is a side view of the body of FIGS. 3-6.

FIG. 8 is generally a top view of the body of FIGS. 3-7, but taken in the direction shown by line 8-8 of FIG. 7.

FIG. 9 is a bottom view of the body of FIGS. 3-8.

FIG. 10 is a front view of the body of FIGS. 3-9.

FIG. 11 is a cross-sectional view of the body of FIGS. 3-10, taken along lines 11-11 of FIG. 10.

FIG. 12 is a cross-sectional view of the body of FIGS. 3-11, taken along lines 12-12 of FIG. 7.

FIG. 14 is a front view of the body used in the insert of FIG. 13.

FIG. 15 is a bottom view of the body of FIGS. 13 and 14.

FIG. 16 is a cross-sectional view of the body of FIGS. 13-15, taken along lines 16-16 of FIG. 14.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
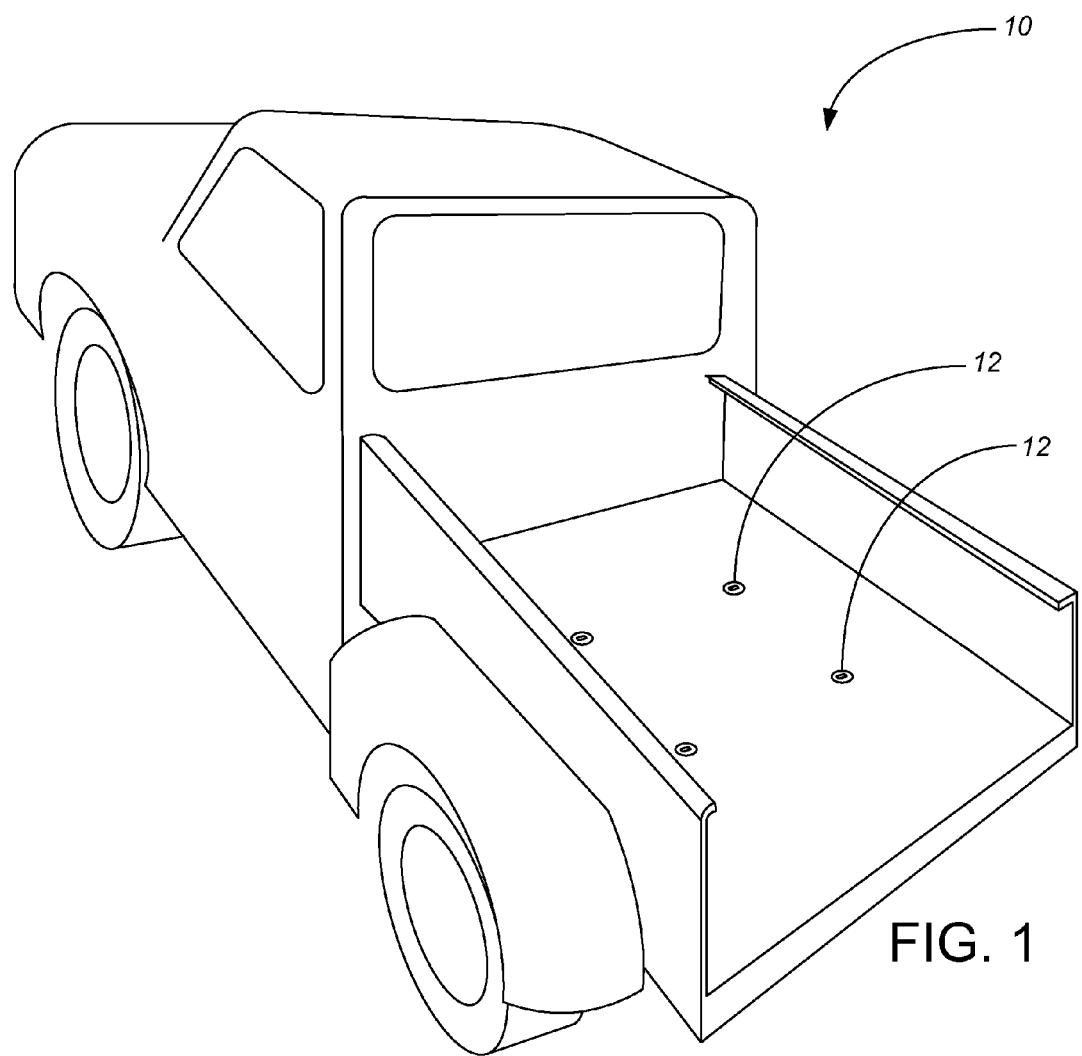
FIG. 1 is a perspective view of a pickup truck having sockets mounted in its bed.
Figure 2:
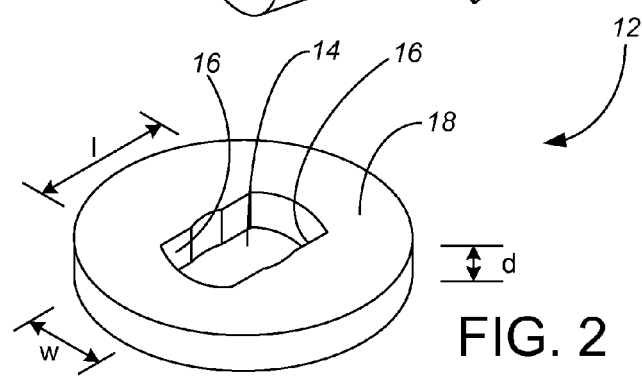
FIG. 2 is a perspective view of a top plate of a socket, which interacts with the present invention.

FIGS. 1 and 2 show a typical socket construction as found in the bed of a pickup truck 10. Each socket 12, also referred to as a "puck", has an opening 14 with two flats 16, with the width w between the two flats 16 being less than the length l of the opening 14. The socket 12 widens out beneath the opening 14, and is provided by a plate 18 having a depth d. The plate 18 is generally installed coplanar with the bed of the pickup truck 10, so the socket 12 itself in no way interferes with use of the pickup truck bed prior to use of the socket 12. The construction of the socket 12 in itself is not part of the present invention, rather the present invention can be designed and dimensioned to mate with the dimensions w, l, d of any existing or future socket design, providing the socket has a non-circular shape that can receive the head of a T-bolt.

As shown in FIGS. 3-12, a first embodiment of the chain attachment insert 20 of the present invention has a body 22 which provides a cleat top portion 24 integrally formed or rigidly joined with a T-bolt portion 26. The T-bolt portion 26 includes a head 28 and a neck 30, with the neck 30 defining an axis of rotation 32 of the chain attachment insert 20 when it is within the socket 12. For a preferred socket 12 have a slot of about one inch (25.4 mm) wide and about 1.63 inches (41.4 mm) long, the neck 30 can be generally cylindrical with a diameter slightly smaller than the socket 12, such as 24.5 mm. The length of the neck 30 is appropriate for the thickness of the socket plate 18, such as about ½ inch (13.5 mm) long.

The T-bolt head 28 has a length and width that generally matches the length l and width w of the socket 12 with a slight clearance in all directions, i.e., a length which is greater than its width so as to fit within the socket 12. For a preferred socket 12 having a slot 14 of about one inch (25.4 mm) wide and about 1.63 inches (41.4 mm) long, the preferred T-bolt head 28 has a width of just under an inch (24.5 mm) and a length of about 1½ inches (39 mm). The bottom surface of the T-bolt head 28 can be angled to assist in placing the T-bolt head 28 into the socket 12, with the preferred T-bolt head 28 formed with about a 55° cone angle.

The cleat top portion 24 includes an open loop chain attachment 34 of appropriate shape to provide an attachment location for a safety chain (not shown). In both preferred embodiments, the open loop chain attachment 34 is in the general shape and size of a chain loop or link of a chain as commonly used in securing pickup truck loads. In both of the embodiments, the open loop chain attachment 34 includes a complete 360° loop of appropriate size for chains. For instance, in the preferred embodiments the opening 36, 38 has a height of about 1½ inches (38 mm), measured vertically in the embodiment of FIGS. 3-12 and measured at a 45° angle to vertical in the embodiment of FIGS. 13-16. The cleat top portion 24 can be formed of metal providing a link such as about an inch (25 mm) wide and about ¾ of an inch (19 mm) thick. The embodiment of FIGS. 3-12 is intended to receive only a single chain or hook, having an opening length of just over two inches (55 mm). The embodiment of FIGS. 13-16 is intended to allow use with two chains or hooks, having an opening length of just under 3 inches (72 mm), for an overall length of about 4½ inches (110 mm). The term "open loop" as used herein does not necessarily require that the chain attachment 34 be a complete 360° loop, but rather that it provide enough of a loop around a central opening 36, 38 that a chain or hook can be secured to the chain attachment insert 20 through the opening 36, 38.

The body 22 has a generally a flat underside 40. The underside 40 preferably extends normal to the axis of rotation 32. Thus, when the flat underside 40 rests on a horizontal bed of a pickup truck 10, the axis of rotation 32 extends vertically.

A hole 42 extends through the body 22. The throughhole 42 is situated so its lower end is within the profile of socket opening 14, i.e., offset from the neck 30 but very close to the neck 30. In the preferred embodiment, the throughhole 42 extends parallel to the axis of rotation 32, located within a cylinder defined by the length of the T-bolt head 28 about the axis of rotation 32. Alternative embodiments can place the throughhole at an angle to vertical or slightly further from the axis of rotation 32, so long as the lower end of the throughhole directs into the profile of the socket opening 14.

The throughhole 42 is sized to receive an interference peg 44, which in the preferred embodiment is shaped as an angle pin. The angle pin 44, also called a hitch pin, is a component commonly found in the hitch industry for use in other applications. In the preferred embodiment, both the throughhole 42 and the interference peg 44 are cylindrical, i.e, circular in horizontal cross-section. While other cross-sectional shapes rather than circular could be used for both the throughhole 42 and the angle peg 44, circular holes and pins are easily and inexpensively formed/obtained. The interference peg 44 can be slid downward through the hole 42, so a lower end of the interference peg 44 resides within the socket opening 14. When the lower end of the interference peg 44 is in the socket opening 14, the interference peg 44 prevents the chain attachment insert 20 from rotating.

The bend 46 in the angle pin 44 provides a shoulder 48. When the angle pin 44 is slid fully downward so its lower end is in the socket opening 14, the shoulder 48 contacts a top edge of the body 22 adjacent the through hole 42. In the preferred embodiments shown in FIGS. 3-16, the top edge is in the form of a recess 50 which receives the shoulder 48 opposite the chain attachment 34, with a grasping end 52 of the angle pin 44 protruding beyond the profile of the body 22. In the preferred embodiment of FIGS. 3-12, the angle pin 44 is cylindrical and about ⅖$^{th}$ of an inch (10 mm) in diameter, with overall dimensions of about 3½ inches (89 mm) by nearly two inches (45 mm). In the preferred embodiment of FIGS. 13-16, the angle pin 44 is cylindrical and about ½ of an inch (12 mm) in diameter, with overall dimensions of about 3¼ inches (83 mm) by nearly two inches (46 mm). When assembled into the body 22, the interference end 54 projects about an inch (27 mm) below the flat underside 40 and into the socket opening 14. At the same time, the grasping end 52 extends about ¾ of an inch (19 mm) beyond the profile of the body 22.

When using a cylindrical angle pin 44, an important consideration is the diameter and location of the angle pin 44 relative to the diameter and location of the neck 30. In the preferred embodiments, the diameter of the neck 30 is chosen to mate with the flats 16 on the socket opening 14, so the neck 30 allows smooth rotation of the chain attachment insert 20 in the socket 12 without rattling or vibration. This would only leave a clearance of slightly less than about ⅓ of an inch (8 mm) between the neck 30 and the edge of the socket opening 14. Rather than user a smaller interference peg that would fit within this clearance, the preferred embodiments use a larger interference peg 44 (⅖$^{th}$ of an inch (10 mm) in diameter in one embodiment, ½ of an inch (12 mm) in diameter in the other embodiment), and instead form a recess 56 in the neck 30 that receives a portion of the interference peg 44. By being received in this recess 56, compression forces between the neck 30 and the interference peg 44 assist in prevent the chain attachment insert 20 from rotating within the slot, meaning that the moment that the attachment insert 20 can support is borne partially as a shear stress on the neck 30 and only partially as a bending force on the interference peg 44. This splitting of forces, coupled with the larger diameter of the interference peg 44, makes the interference peg 44 substantially less likely to fail during a catastrophic event. In the preferred embodiment, the T-bolt head 28 also has a recess 58 for a portion of the interference peg 44, with the recess 58 in the T-bolt head 28 being a continuation of the recess 56 in the neck 30, which further minimizes any rattling or vibration.

While other shapes could be used for the interference peg 44, a key feature is that the interference peg 44 can be inserted and removed from the throughhole 42 without interfering with any chain or hook attached in to the opening 36, 38. This allows the interference peg 44 to be mated to and separable from the body 22 by sliding in a direction parallel to the axis of rotation 32 without regard to whether the chain attachment insert 20 is attached to a chain or hook. The user's decision of whether and when to attach a chain or hook to the chain attachment insert 20 is entirely independent of the user's decision of whether and when to secure or release the chain attachment insert 20 to the socket 12.

In both of the shown preferred embodiments, the open loop chain attachment 34 is offset from the axis of rotation 32, but not too far. By having the open loop chain attachment 34 offset from the axis of rotation 32, the angle pin 44 can be positioned on one side of the body 22 while not interfering with the chain attachment 34. By having the open loop chain attachment 34 close to the axis of rotation 32, moments produced by a sideways pull force on the open loop chain attachment 34 are minimized, so the chain attachment insert 20 can fully withstand the substantial forces to which it will be subjected (such as when a hitch safety chain is employed and needed to avoid a catastrophic loss of the towed load). In the preferred embodiment of FIGS. 3-12 and as best shown in FIG. 7, the opening 36 for the opening loop chain attachment 34 begins at a same distance offset from the axis of rotation 32 as a flat on the T-bolt head 28, i.e, about ½ inch (13 mm) away from the axis of rotation 32 and in vertical alignment with the side of the T-bolt head 28 and neck 30.

A lynch pin 60 serves as a lock for securing the interference peg 44 relative to the body 22 and within the throughhole 42. The preferred body 22 includes two ears 62 for receiving the lynch pin 60. Each ear 62 has a lynch pin hole 64 of appropriate diameter for receiving the lynch pin 60 in a horizontal position where the lynch pin 60 prevents the interference peg 44 from being removed from the throughhole 42. In the preferred embodiment, the lynch pin 60 has a diameter of about ⅕ of an inch (5 mm). The lynch pin 60 also includes a ring 66 which, as known in lynch pin art, is spring biased downward onto the pin portion 68 but is hand bendable away from the pin portion 68. To insert or remove the lynch pin 60, the user pulls the ring portion 66 away from the pin portion 68, allowing the lynch pin 60 to be freely slid into or out of the ears 62. When the lynch pin 60 is fully in place, the ring portion 66 snaps over the two ears 62, securely holding the lynch pin 60 in place.

If desired, a tether (not shown) may be used to attach the lynch pin 60 to the body 22, and/or a separate tether (not shown) may be used to attach the angle pin 44 to the body 22. Such tethers help the user from losing or misplacing the lynch pin 60 and/or the angle pin 44. However, the preferred method is to have the user simply replace both the angle pin 44 and the lynch pin 60 into the body 22 whenever the body 22 is removed from the socket 12 or placed into the socket 12, i.e., the only time the angle pin 44 and lynch pin 60 are not attached to the body 22 is for the few seconds when the chain attachment insert 20 is being placed into or removed from the socket 12.

Figure 3:
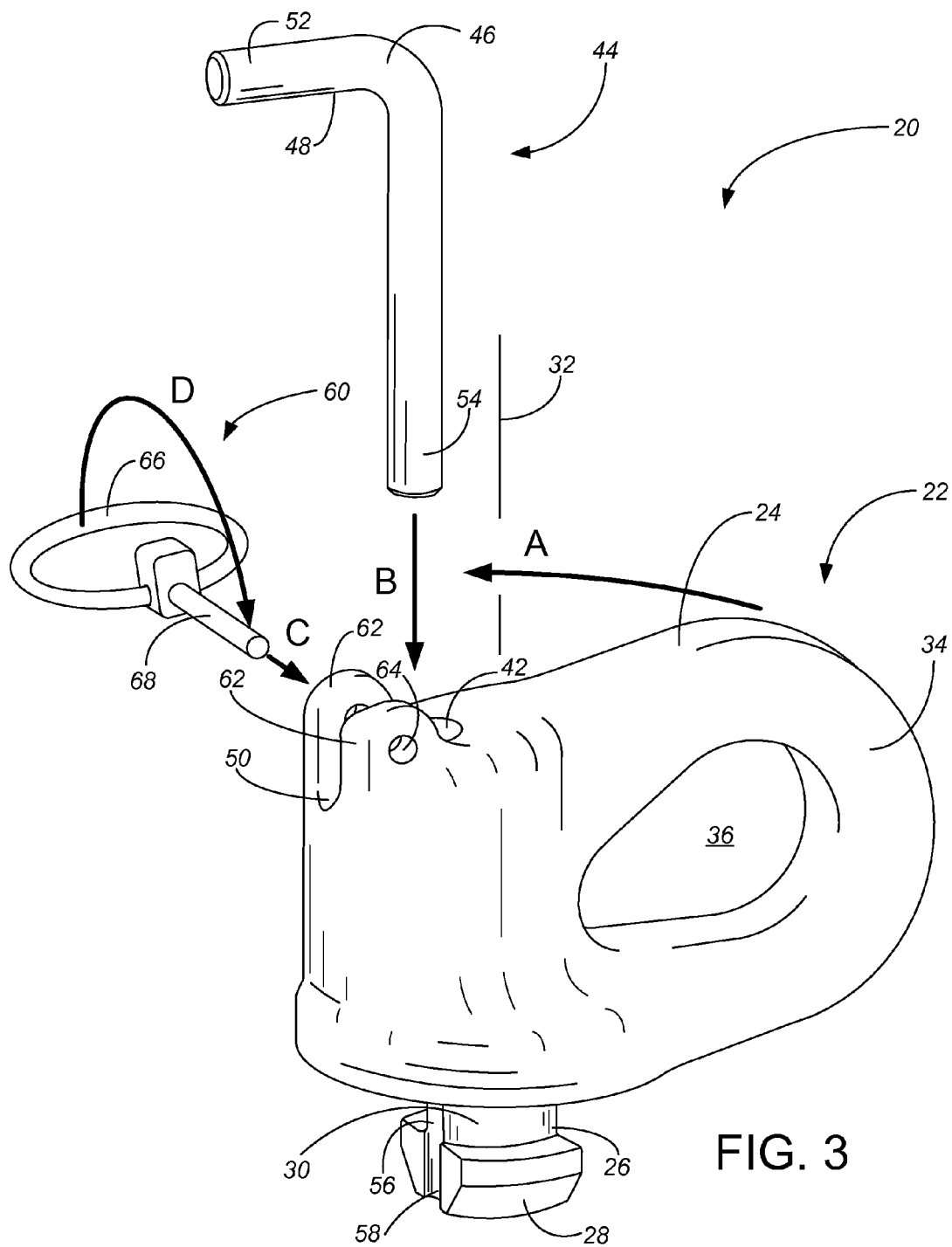
FIG. 3 is an unassembled perspective view of a first embodiment of the present invention.
Figure 4:
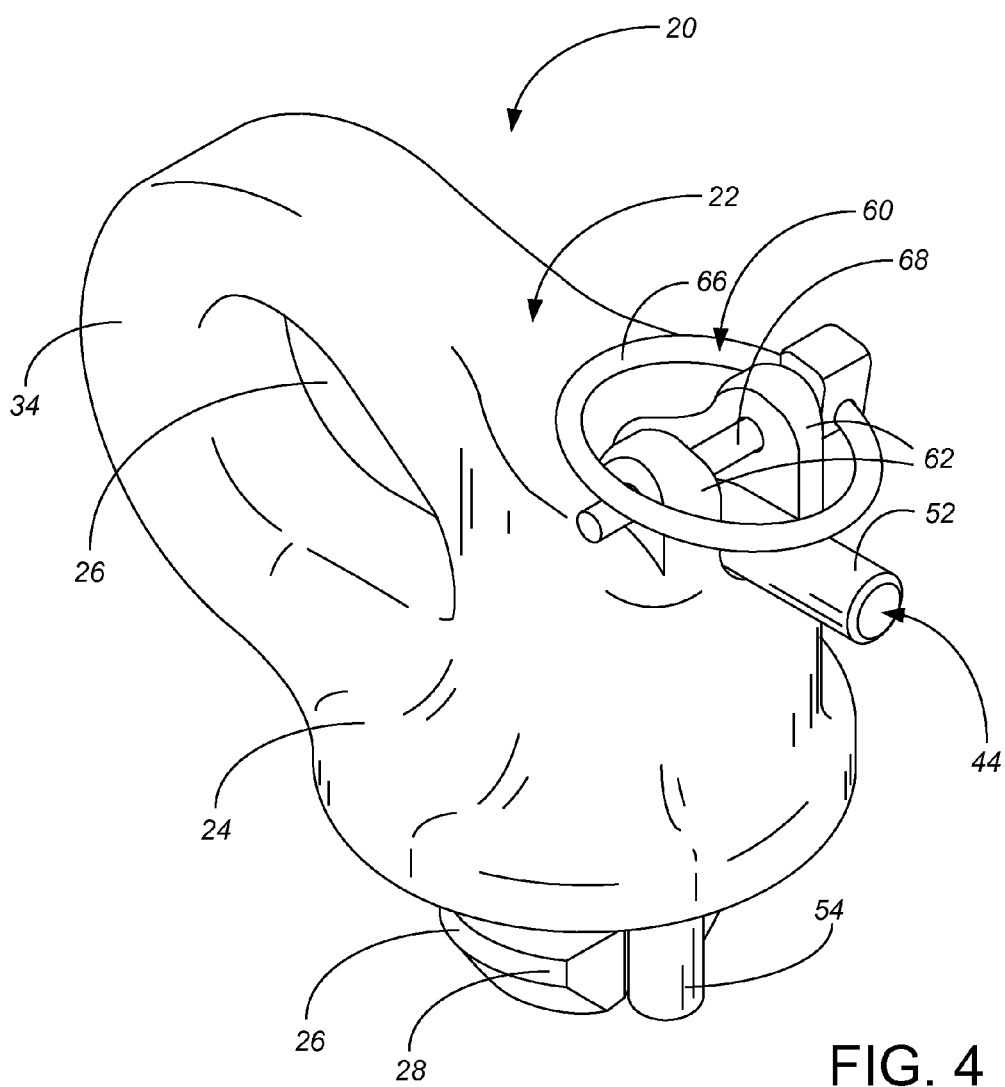
FIG. 4 is an assembled perspective view of the insert of FIG. 3.
Figure 5:
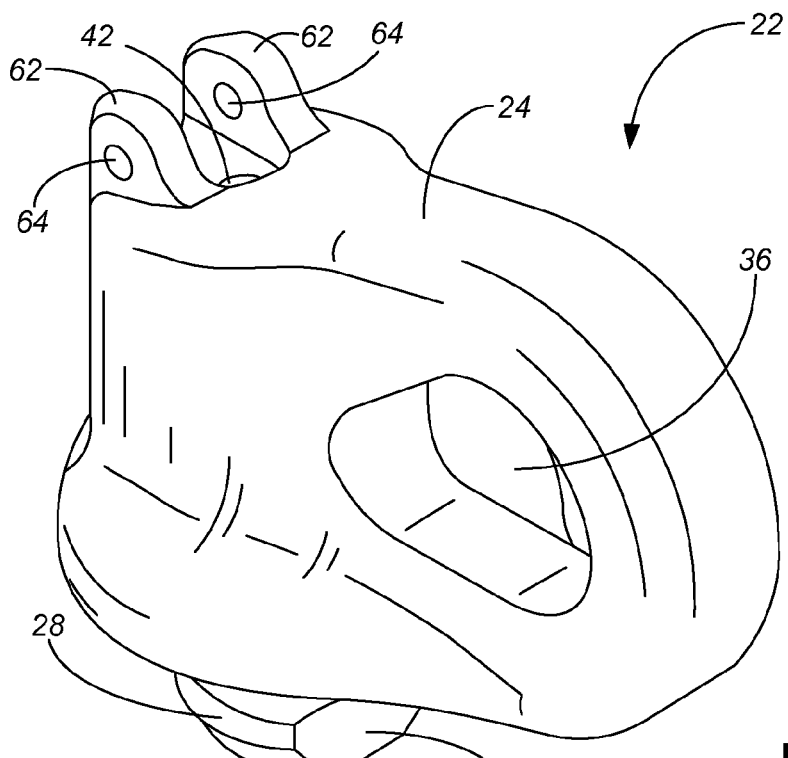
FIG. 5 is a perspective top view of the body used in the insert of FIGS. 3 and 4.
Figure 6:
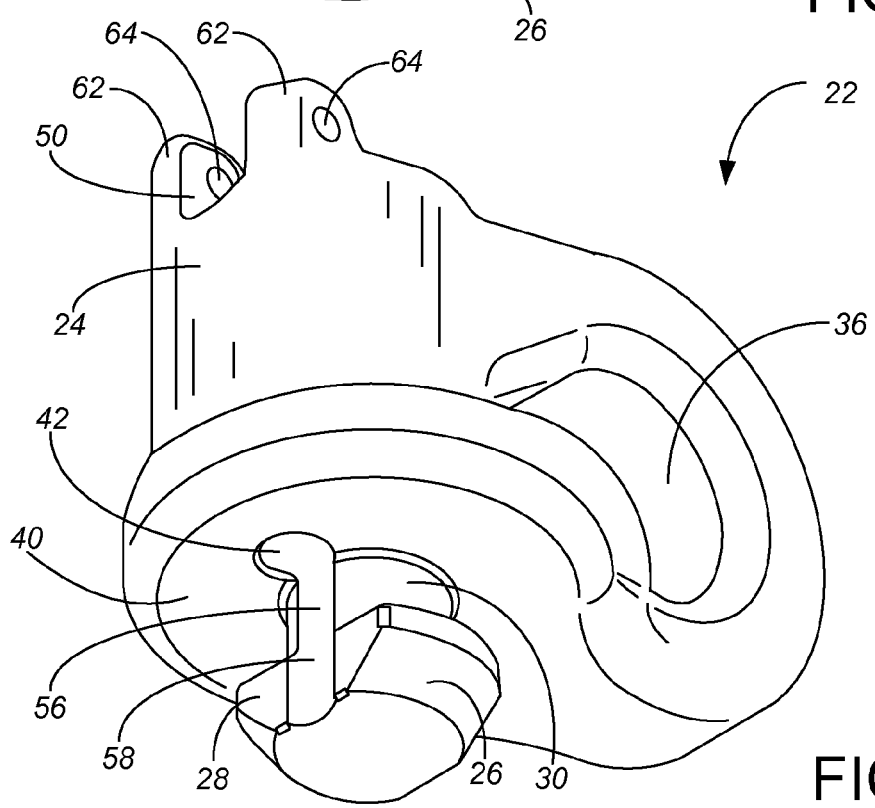
FIG. 6 is a perspective bottom view of the body of FIGS. 3-5.
Figure 13:
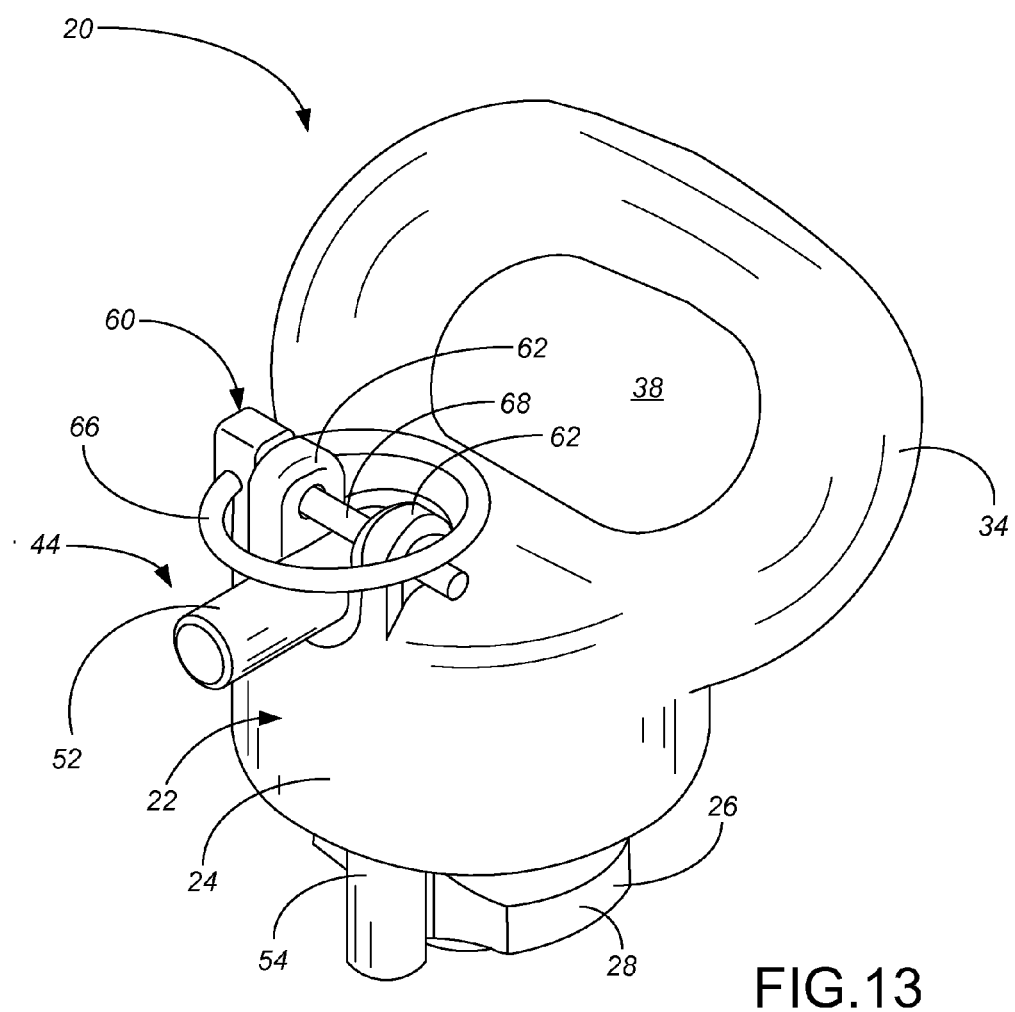
FIG. 13 is an assembled perspective view of a second embodiment of the present invention.

Given the inventive structure of the chain attachment insert 20, its method of use in a bed of a pickup truck 10 having appropriate sockets 12 is straightforward, further explained with regard to FIGS. 3 and 4. To place the chain attachment insert 20 into the socket 12, the lynch pin 60 and angle pin 44 are removed from their respective holes, 42. The chain attachment insert 20 is positioned so the head 28 of the T-bolt is oriented to pass through the socket opening 14, and the chain attachment insert 20 is dropped into the socket opening 14, so the flat underside 40 is on the bed of the truck 10. The user then rotates the chain attachment insert 20 90° about its axis of rotation 32 as shown by arrow A. The user then drops/slides the angle pin 44 fully downward so the bottom end of the angle pin 44 resides in the socket opening 14 as shown by arrow B. The user than locks the angle pin 44 in place with the lynch pin 60 by inserting the lynch pin 60 as shown by arrow C, with the ring 66 of the lynch pin 60 snapping over the ears 62 as shown by arrow D.

The user can then use the open loop chain attachment 34 as desired, such as for a safety chain for a hitch or for securing any type of load into the bed of the pickup truck 10.

When the user desires a flat bed of the pickup truck 10 for certain loads, the user simply reverses these steps A-D, either with or without removing the chain or hook from the open loop chain attachment 34. That is, the user detaches the lynch pin 60 by pulling on the ring 66 and sliding the lynch pin 60 from the lynch pin holes. The user then grasps the grasping end 52 of the interference peg 44 and separates the interference peg 44 from the body 22 by sliding the interference peg 44 upward in a direction parallel to the axis of rotation 32. The user rotates the chain attachment insert 20 90° about its axis of rotation 32 so the T-bolt head 28 aligns with the socket 12. After this 90° rotation, the safety chain attachment insert 20 can be pulled upward and removed from the socket 12, leaving a clean and unimpeded bed of the pickup truck 10. Either with or without the chain or hook being attached to the open loop chain attachment 34, the user can then once again replace the angle pin 44 and lynch pin 60 for stowage.

The body 22, the angle pin 44 and the lynch pin 60 are all preferably made of strong, robust materials which will resist corrosion and be able to withstand the stresses of years of use. The preferred bodies are formed of 1040 steel, powder coated. The angle pin 44 and the lynch pin 60 can be formed of 1018 cold rolled steel or stainless steel.

Figure 17:
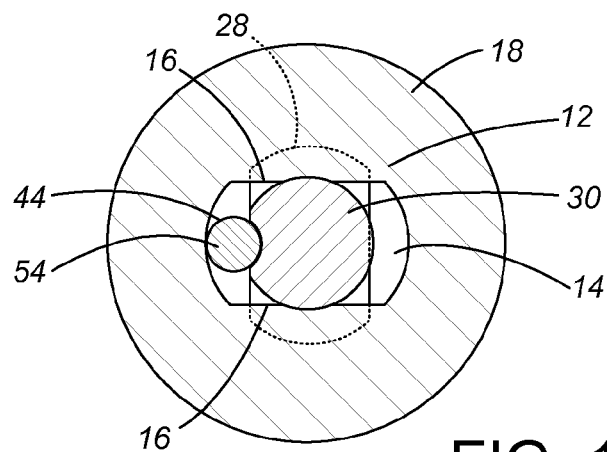
FIG. 17 is a cross-section view of the insert of FIGS. 3-12, assembled into the socket of FIGS. 1 and 2.
Figure 18:
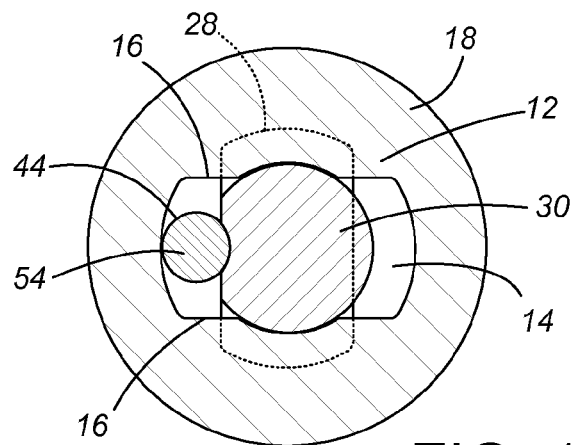
FIG. 18 is a cross-sectional view of the insert of FIGS. 13-16, assembled into a socket.
Figure 19:
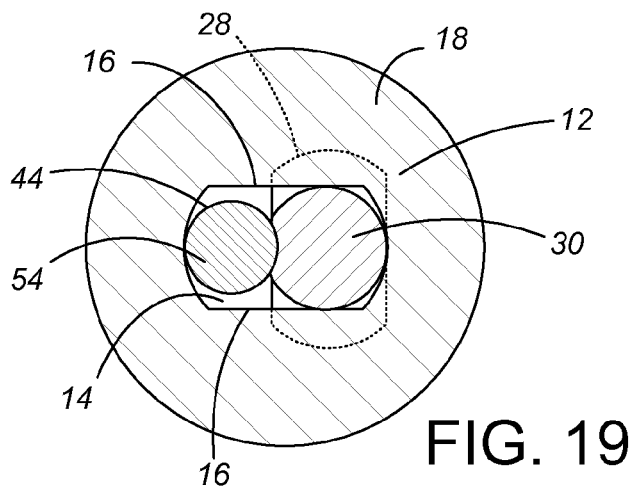
FIG. 19 is a cross-sectional view of a third embodiment, assembled into a socket.

Two ways in which the angle pin 44 can prevent rotation of the body 22 when inserted into the socket 12 are best shown in FIGS. 17-19. In FIGS. 17 and 18, the neck 30 is received in a wider portion of the socket 12, and rotation of the body 22 in the socket 12 occurs without any lateral sliding. In the alternative embodiment of FIG. 19, the socket 12 has no wider portion, allowing the neck 30 to slide laterally in the socket 12. By sliding the neck 30 laterally to one edge of the socket 12, an even larger angle pin 44 can be used to fill the space between the neck 30 and the other edge of the socket 12.

Although the present invention has been described with reference to preferred embodiments, workers skilled in the art will recognize that changes may be made in form and detail without departing from the spirit and scope of the invention.

What is claimed is:
1. A chain attachment insert comprising:
    a T-bolt head having a length which is greater than its width, so as to fit in a socket in a bed of a pickup truck;
    a neck above the T-bolt head, the neck defining an axis of rotation for the chain attachment insert while the chain attachment insert is in the socket;
    a body above the neck and being wider than the neck, the body having a flat underside normal to the axis of rotation, such that when the flat underside extends horizontally the axis of rotation extends vertically, the body providing an open loop chain attachment for receiving a chain or hook;

a hole through the body extending parallel to the axis of rotation, offset from the neck but located within a cylinder defined by the length of the T-bolt head about the axis of rotation, the body having a top edge around the hole, with the T-bolt head, neck and body being connected such that the hole and the top edge around the hole rotate about the axis of rotation whenever the T-bolt head rotates about the axis of rotation; and an interference peg insertable through the hole in a vertical slide direction, the interference peg having a shoulder which, when contacting the top edge of the body around the vertically extending hole, supports the interference peg at an elevation such that a portion of the interference peg resides in the socket adjacent the neck to interfere with and prevent the chain attachment insert from rotating relative to the socket; the interference peg being separable from the body by sliding in a direction parallel to the axis of rotation.

2. The chain attachment insert of claim 1, wherein the interference peg is an angle pin.

3. The chain attachment insert of claim 2, wherein the angle pin can be inserted into and removed from the hole without interfering with the open loop chain attachment of the body, such that the chain attachment insert can be secured and released from the socket without removing the chain or hook from the open loop chain attachment.

4. The chain attachment insert of claim 3, wherein the open loop chain attachment is offset from the axis of rotation.

5. The chain attachment insert of claim 1, wherein the hole through the body is cylindrical, and wherein the interference peg within the hole and adjacent the neck in the socket is cylindrical.

6. The chain attachment insert of claim 1, further comprising a lock for securing the interference peg within the hole in the body, wherein the lock is a lynch pin.

7. A chain attachment insert comprising:

a T-bolt head having a length which is greater than its width, so as to fit in a socket in a bed of a pickup truck;

a neck above the T-bolt head, the neck defining an axis of rotation for the chain attachment insert while the chain attachment insert is in the socket;

a body above the neck and being wider than the neck, the body having a flat underside normal to the axis of rotation, such that when the flat underside extends horizontally the axis of rotation extends vertically, the body providing an open loop chain attachment for receiving a chain or hook;

a hole through the body extending parallel to the axis of rotation, offset from the neck but located within a cylinder defined by the length of the T-bolt head about the axis of rotation, the body having a top edge around the hole;

an interference peg insertable through the hole in a vertical slide direction, the interference peg having a shoulder which, when contacting the top edge of the body around the vertically extending hole, supports the interference peg at an elevation such that a portion of the interference peg resides in the socket adjacent the neck to interfere with and prevent the chain attachment insert from rotating relative to the socket; the interference peg being separable from the body by sliding in a direction parallel to the axis of rotation, wherein the interference peg is an angle pin, wherein the shoulder of the angle pin is received in a recess of the body, with an end of the angle pin extending beyond a profile of the body to a location where the end can be grasped for sliding the angle pin out of the body; and a lock for securing the interference peg within the hole in the body.

8. The chain attachment insert of claim 7, wherein the lock is a lynch pin.

9. The chain attachment insert of claim 8, wherein the body comprises two lynch pin holes defining a lynch pin axis extending perpendicular to and over the hole for the angle pin, such that placement of the lynch pin into the lynch pin holes interferes with removal of the angle pin from the body.

10. A chain attachment insert comprising:

a T-bolt head having a length which is greater than its width, so as to fit in a socket in a bed of a pickup truck;

a neck above the T-bolt head, the neck defining an axis of rotation for the chain attachment insert while the chain attachment insert is in the socket;

a body above the neck and being wider than the neck, the body having a flat underside normal to the axis of rotation, such that when the flat underside extends horizontally the axis of rotation extends vertically, the body providing an open loop chain attachment for receiving a chain or hook, wherein the open loop chain attachment is offset from the axis of rotation, wherein an opening for the open loop chain attachment begins at a same distance offset from the axis of rotation as a flat on the T-bolt head;

a hole through the body extending parallel to the axis of rotation, offset from the neck but located within a cylinder defined by the length of the T-bolt head about the axis of rotation, the body having a top edge around the hole;

an interference peg insertable through the hole in a vertical slide direction, the interference peg having a shoulder which, when contacting the top edge of the body around the vertically extending hole, supports the interference peg at an elevation such that a portion of the interference peg resides in the socket adjacent the neck to interfere with and prevent the chain attachment insert from rotating relative to the socket; the interference peg being separable from the body by sliding in a direction parallel to the axis of rotation, wherein the interference peg is an angle pin, wherein the angle pin can be inserted into and removed from the hole without interfering with the open loop chain attachment of the body, such that the chain attachment insert can be secured and released from the socket without removing the chain or hook from the open loop chain attachment; and a lock for securing the interference peg within the hole in the body.

11. A chain attachment insert comprising:

a T-bolt head having a length which is greater than its width, so as to fit in a socket in a bed of a pickup truck;

a neck above the T-bolt head, the neck defining an axis of rotation for the chain attachment insert while the chain attachment insert is in the socket;

a body above the neck and being wider than the neck, the body having a flat underside normal to the axis of rotation, such that when the flat underside extends horizontally the axis of rotation extends vertically, the body providing an open loop chain attachment for receiving a chain or hook;

a hole through the body extending parallel to the axis of rotation, offset from the neck but located within a cylinder defined by the length of the T-bolt head about the axis of rotation, the body having a top edge around the hole;
an interference peg insertable through the hole in a vertical slide direction, the interference peg having a shoulder which, when contacting the top edge of the body around the vertically extending hole, supports the interference peg at an elevation such that a portion of the interference peg resides in the socket adjacent the neck to interfere with and prevent the chain attachment insert from rotating relative to the socket; the interference peg being separable from the body by sliding in a direction parallel to the axis of rotation, wherein the neck comprises a recess for a portion of the interference peg; and
a lock for securing the interference peg within the hole in the body.

12. The chain attachment insert of claim 11, wherein the T-bolt head comprises a recess for a portion of the interference peg, with the recess in the T-bolt head being a continuation of the recess in the neck.

13. A chain attachment insert comprising:
a T-bolt head having a length which is greater than its width, so as to fit in a socket in a bed of a pickup truck;
a neck above the T-bolt head, the neck defining an axis of rotation for the chain attachment insert while the chain attachment insert is in the socket, wherein the neck is generally cylindrical, with an outer diameter of the neck being larger than the width of the T-bolt head;
a body above the neck and being wider than the neck, the body having a flat underside normal to the axis of rotation, such that when the flat underside extends horizontally the axis of rotation extends vertically, the body providing an open loop chain attachment for receiving a chain or hook;
a hole through the body extending parallel to the axis of rotation, offset from the neck but located within a cylinder defined by the length of the T-bolt head about the axis of rotation, the body having a top edge around the hole;
an interference peg insertable through the hole in a vertical slide direction, the interference peg having a shoulder which, when contacting the top edge of the body around the vertically extending hole, supports the interference peg at an elevation such that a portion of the interference peg resides in the socket adjacent the neck to interfere with and prevent the chain attachment insert from rotating relative to the socket; the interference peg being separable from the body by sliding in a direction parallel to the axis of rotation; and
a lock for securing the interference peg within the hole in the body.

14. A chain attachment insert comprising:
a T-bolt head having a length which is greater than its width, so as to fit in a socket in a bed of a pickup truck;
a neck above the T-bolt head, the neck defining an axis of rotation for the chain attachment insert while the chain attachment insert is in the socket;
a body above the neck and being wider than the neck, the body having a flat underside normal to the axis of rotation, such that when the flat underside extends horizontally the axis of rotation extends vertically, the body providing an open loop chain attachment for receiving a chain or hook;
a hole through the body extending parallel to the axis of rotation, offset from the neck but located within a cylinder defined by the length of the T-bolt head about the axis of rotation, the body having a top edge around the hole;
an interference peg insertable through the hole in a vertical slide direction, the interference peg having a shoulder which, when contacting the top edge of the body around the vertically extending hole, supports the interference peg at an elevation such that a portion of the interference peg resides in the socket adjacent the neck to interfere with and prevent the chain attachment insert from rotating relative to the socket; the interference peg being separable from the body by sliding in a direction parallel to the axis of rotation; and
a lock for securing the interference peg within the hole in the body, wherein the lock is a lynch pin, wherein the body comprises two lynch pin holes defined in ears of the body, the two lynch pin holes defining a lynch pin axis extending perpendicular to and over the hole for the interference peg, such that placement of the lynch pin into the lynch pin holes interferes with removal of the interference peg from the body, wherein the lynch pin comprises a ring which can extend over the ears.

15. A method of using a chain attachment insert in a socket in a bed of a pickup truck, the socket having a length which is greater than its width, the method comprising:
dropping a T-bolt head and neck of a chain attachment insert into the socket, the T-bolt head having a length which is greater than its width, so as to fit in the socket, the neck defining an axis of rotation for the chain attachment insert while the chain attachment insert is in the socket, the chain attachment insert having a body above the neck and being wider than the neck, the body having a flat underside normal to the axis of rotation such that, when the flat underside extends horizontally the axis of rotation extends vertically, the body providing an open loop chain attachment for receiving a chain or hook, the body having a throughhole extending parallel to the axis of rotation, offset from the neck but located within a cylinder defined by the length of the T-bolt head about the axis of rotation, the body having a top edge around the throughhole, with the T-bolt head, neck and body being connected such that the throughhole and the top edge around the throughhole rotate about the axis of rotation whenever the T-bolt head rotates about the axis of rotation;
rotating the chain attachment insert 90° about its axis of rotation; and
inserting an interference peg through the throughhole in a vertical slide direction, the interference peg having a shoulder, such that the shoulder of the interference peg contacts the top edge of the body around the vertically extending throughhole to support the interference peg at an elevation such that a portion of the interference peg resides in the socket adjacent the neck to interfere with and prevent the chain attachment insert from rotating relative to the socket.

16. The method of claim 15, further comprising attaching a lock to elevationally secure the interference peg within the hole in the body, wherein the lock comprises a lynch pin, and wherein attaching the lock is achieved by sliding the lynch pin horizontally within two holes of the body above the interference peg.

17. The method of claim 15, further comprising:
attaching a lock to elevationally secure the interference peg within the hole in the body;
detaching the lock; and separating the interference peg from the body by sliding the interference peg upward in a direction parallel to the axis of rotation.

18. The method of claim 17, further comprising:
attaching a chain or hook to the open loop chain attachment;
rotating the chain attachment insert 90° about its axis of rotation so the T-bolt head aligns with the socket; and
lifting the chain attachment insert out of the socket without removing the chain or hook from the open loop chain attachment.

19. The method of claim 18, further comprising;
reinserting the interference peg into the through hole while the chain or hook is attached to the open loop chain attachment; and
reattaching a lock to elevationally secure the interference peg within the hole in the body while the chain or hook is attached to the open loop chain attachment.

20. A method of using a chain attachment insert in a socket in a bed of a pickup truck, the socket having a length which is greater than its width, the method comprising:
dropping a T-bolt head and neck of a chain attachment insert into the socket, the T-bolt head having a length which is greater than its width, so as to fit in the socket, the neck defining an axis of rotation for the chain attachment insert while the chain attachment insert is in the socket, the chain attachment insert having a body above the neck and being wider than the neck, the body having a flat underside normal to the axis of rotation such that, when the flat underside extends horizontally the axis of rotation extends vertically, the body providing an open loop chain attachment for receiving a chain or hook, the body having a throughhole extending parallel to the axis of rotation, offset from the neck but located within a cylinder defined by the length of the T-bolt head about the axis of rotation, the body having a top edge around the throughhole;
rotating the chain attachment insert 90° about its axis of rotation;
inserting an interference peg through the throughhole in a vertical slide direction, the interference peg having a shoulder, such that the shoulder of the interference peg contacts the top edge of the body around the vertically extending throughhole to support the interference peg at an elevation such that a portion of the interference peg resides in the socket adjacent the neck to interfere with and prevent the chain attachment insert from rotating relative to the socket; and
attaching a lock to elevationally secure the interference peg within the hole in the body, wherein the lock comprises a lynch pin, and wherein attaching the lock is achieved by sliding the lynch pin horizontally within two holes of the body above the interference peg, wherein the two holes of the body are defined in ears, and further comprising pivoting a ring of the lynch pin over the ears of the body.

* * * * *